(12) United States Patent
Rambo et al.

(10) Patent No.: US 7,650,527 B2
(45) Date of Patent: Jan. 19, 2010

(54) MIPS RECOVERY TECHNIQUE

(75) Inventors: Darwin Rambo, Surrey (CA); Philip Houghton, Surrey (CA)

(73) Assignee: Broadcom Corporation, Irvine, CA (US)

(*) Notice: Subject to any disclaimer, the term of this patent is extended or adjusted under 35 U.S.C. 154(b) by 456 days.

(21) Appl. No.: 11/348,689

(22) Filed: Feb. 7, 2006

(65) Prior Publication Data

US 2007/0186128 A1    Aug. 9, 2007

(51) Int. Cl.
  G06F 1/00    (2006.01)
  G06F 11/00   (2006.01)
  G01R 35/00   (2006.01)

(52) U.S. Cl. .................. 713/600; 713/500; 714/100; 702/106

(58) Field of Classification Search ............... 713/500, 713/501, 502, 503, 600, 601; 702/75, 106; 714/100
  See application file for complete search history.

(56) References Cited

U.S. PATENT DOCUMENTS

| | | | | |
|---|---|---|---|---|
| 4,408,291 A * | 10/1983 | Gunzberg et al. | ........... | 700/115 |
| 5,839,096 A * | 11/1998 | Lyons et al. | ................ | 702/183 |
| 5,978,929 A * | 11/1999 | Covino et al. | ............... | 713/503 |
| 6,172,611 B1 * | 1/2001 | Hussain et al. | ............... | 340/584 |
| 6,535,986 B1 * | 3/2003 | Rosno et al. | ................ | 713/400 |
| 6,587,800 B1 * | 7/2003 | Parker et al. | .................. | 702/79 |
| 6,857,066 B2 * | 2/2005 | Bigbee et al. | .................. | 713/1 |
| 7,062,628 B2 * | 6/2006 | Amano | ....................... | 711/170 |
| 7,073,082 B2 * | 7/2006 | Hsu | .......................... | 713/323 |
| 7,085,993 B2 * | 8/2006 | Goodnow et al. | .......... | 714/798 |
| 7,382,366 B1 * | 6/2008 | Klock et al. | ................ | 345/213 |
| 7,469,366 B1 * | 12/2008 | Reed | .......................... | 714/704 |
| 2003/0103588 A1 * | 6/2003 | Tanada et al. | ............... | 375/343 |
| 2004/0019844 A1 * | 1/2004 | Goodnow et al. | .......... | 714/798 |
| 2004/0153679 A1 * | 8/2004 | Fitton et al. | ................. | 713/322 |
| 2006/0217865 A1 * | 9/2006 | Sanders | ...................... | 701/60 |
| 2007/0050581 A1 * | 3/2007 | Mangione-Smith | ......... | 711/163 |
| 2008/0126826 A1 * | 5/2008 | Riedlinger et al. | .......... | 713/600 |

OTHER PUBLICATIONS

W1zzard, ATITool Wiki, Jan. 16, 2006.*

* cited by examiner

Primary Examiner—Mark Connolly
(74) Attorney, Agent, or Firm—McAndrews, Held & Malloy (57) ABSTRACT

Self-calibration of devices such as computer and graphics processors permits adjustment of processor clock rates, and access to normally unused processor capacity. Processor clock rates specified by device manufacturers are normally selected to insure operation across the entire manufacturer-specified range of operating temperatures and supply voltages. By limiting processor clock rates to nominal values, even when operating well within manufacturer-specified temperature and/or supply voltage limits, designers sacrifice processor capacity. By determining the upper limits of processor clock rates at which reliable operation can be realized, and adjusting processor clock rates to match those speeds, a representative embodiment of the present invention permits device users to gain additional, previously inaccessible processing capacity.

60 Claims, 6 Drawing Sheets

MIPS RECOVERY TECHNIQUE

RELATED APPLICATIONS

[Not applicable]

FEDERALLY SPONSORED RESEARCH OR DEVELOPMENT

[Not applicable]

MICROFICHE/COPYRIGHT REFERENCE

[Not applicable]

BACKGROUND OF THE INVENTION

During fabrication, present day processor integrated circuits (ICs) such as, for example, microprocessors, digital signal processors, graphics processors, and the like, are typically screened and classified into batches. The manufacturer normally sets a nominal processor clock rate based upon a statistical analysis of device behavior under different temperature conditions. The screening results in different batches of devices that run at different nominal processor clock rates. The selected nominal processor clock rate of each batch is picked so that the IC devices in the batch are operational over the worst case combinations of temperature, supply voltage, and process variation. Prescreening may also be employed prior to or as a part of mass production, by sorting each part of the fly.

In most cases, designs in which a processor IC is used operate the device far from the temperature and voltage extremes for which the part is rated. A vast majority of the processor ICs in use are capable of operating at processor clock rates far in excess of what is normally used, when operated in typical system environments (e.g., within temperature controlled business and residential premises). Processor clock rates for processor ICs may, in some instances, be raised 20% without experiencing processor operational problems. This is due to the fact that the designers of the equipment using the processor ICs limited their designs to the maximum processor clock rates published for the part by the IC manufacturer.

Operating at higher than manufacturer-specified clock rates, also known as "over-clocking" is common among some user groups, such as users of high-end personal computer game systems. Processor clock rates to be used in "over-clocking" are normally determined using imprecise trial and error methods that fail to fully and reliably realize the extent of the processor computing resource available.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A circuit, method, and system for self-calibrating an optimum processor clock rate, substantially as shown in and/or described in connection with at least one of the figures, as set forth more completely in the claims.

These and other advantages, aspects, and novel features of the present invention, as well as details of illustrated embodiments, thereof, will be more fully understood from the following description and drawings.

DETAILED DESCRIPTION OF THE INVENTION

Aspects of the present invention relate to optimizing digital processor circuit performance. More specifically, aspects of the present invention relate to a circuit, method, and system enabling automatic optimization of processor clock rates in digital processor circuits, providing greater processor throughput with minimal additional circuit complexity or cost. A representative embodiment of the present invention may execute a self-calibration in which the processor circuit performs a series of sanity checks, each at a higher processor clock rate. The behavior during this activity may be used to determine a processor clock rate at which reliable operation of the processor circuit can be expected, and which is higher than the nominal processor clock rate set by the manufacturer. This higher processor clock rate permits the processor circuit to perform more useful work, or operation at a higher level of accuracy or fidelity at little or no additional cost. Although the following discussion describes representative embodiments of the present invention in terms of computer processor units and processor integrated circuits, this is by way of example and does not represent specific limitations of the present invention. The techniques disclosed have application in a wide variety of electronic equipment comprising, for example, microprocessors and microprocessor cores, microcontrollers, digital signal processors and digital signal processor cores (DSPs), graphics processors, application specific integrated circuits (ASICs), field programmable logic circuits (FPGAs), to name only a few. The terms microprocessor core and digital signal processor core are used herein to represent, respectively, microprocessor and digital signal processor circuitry that is embedded within an integrated circuit containing significant additional functional elements that may interface with or be under control of the microprocessor or digital signal processor core.

Figure 1:
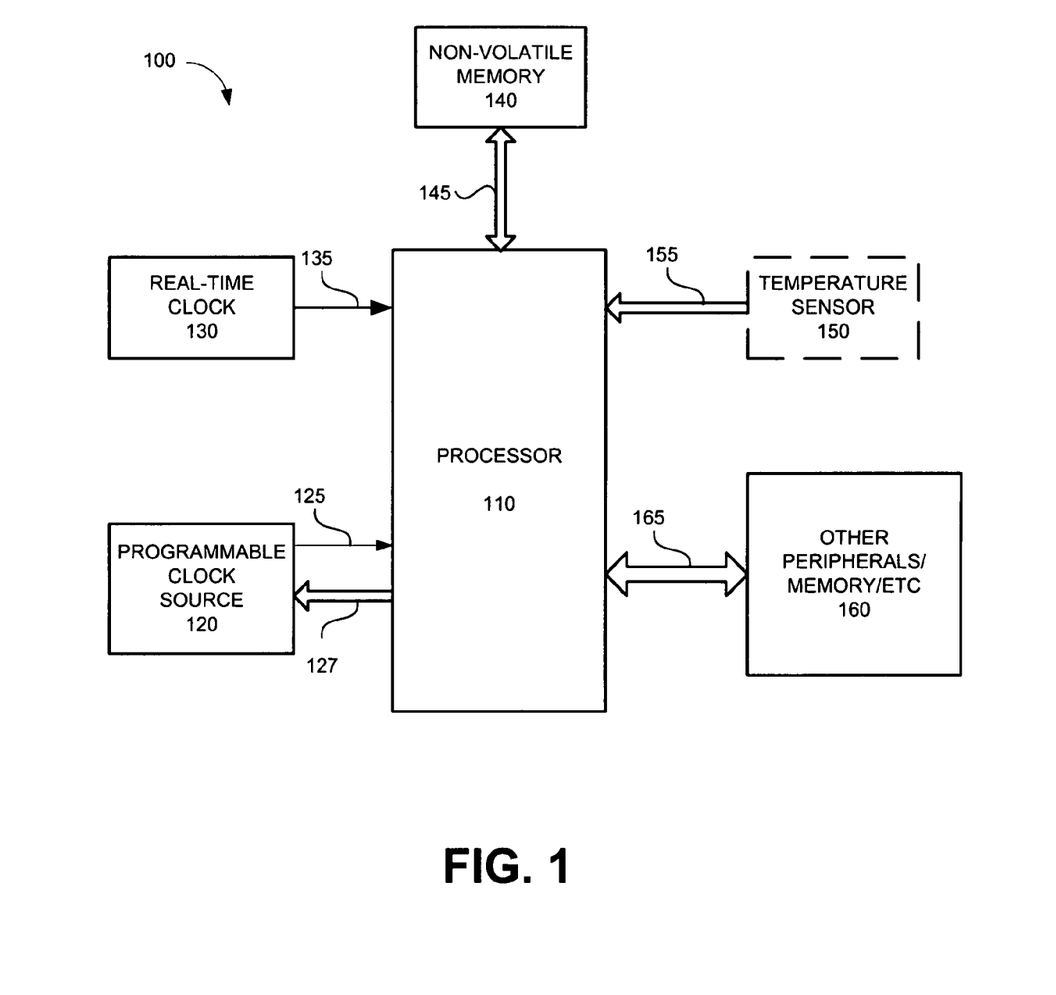
FIG. 1 illustrates an exemplary computer processor circuit that supports processor clock rate optimization, in accordance with a representative embodiment of the present invention.

FIG. 1 illustrates an exemplary computer processor circuit 100 that supports processor clock rate optimization, in accordance with a representative embodiment of the present invention. The computer processor circuit 100 of FIG. 1 comprises a processor 110 communicatively coupled to a non-volatile (NV) memory 140, a temperature sensor 150, and other peripheral/memory/etc 160. In addition, the processor 110 receives information from a real-time clock 130 to enable processor 110 to measure intervals of time. The processor 110 operates according to a processor clock 125 provided by a programmable clock source 120. The computer processor circuit 100 may be employed in a wide variety of devices having need for processing capability, as many of the elements of computer processor circuit 100 are present in existing electronic devices.

The processor 110 may comprise, for example, any of a number of different commercial microprocessors from manufacturers such as Intel Corporation, IBM Corporation, Free-Scale Semiconductor, and Texas Instruments. A representative embodiment of the present invention may also be employed with other forms of digital circuitry that operates according to a clock, including digital signal processors, field programmable logic arrays (FPGAs), application specific integrated circuits (ASICs), to name only a few examples.

The programmable clock source 120 comprises a clock generator circuit having clock output(s) compatible with the processor 110. In a representative embodiment of the present invention, a programmable clock source such as, for example, the programmable clock source 120 may be capable of providing clock signals at rates that expand beyond the highest processor clock rates for which the processor 110 is specified. For example, the programmable clock source 120 may generate clock signal(s) at rates that exceed the maximum manufacturer-specified processor clock rates by, for example, anywhere from 10 to 40%. The Applicant has performed testing that indicates that when operating under typical conditions of temperature and supply voltage, some processors are capable of operating at approximately 20% above their nominal or rated processor clock rates. This additional unrealized processor throughput enables a representative embodiment of the present invention to set processor clock rates above the maximum manufacturer-specified clock rates when a processor self-calibration activity to be described in detail below, so indicates. The programmable clock source 120 of FIG. 1 receives control signals 127 that indicate the desired processor clock rate to be transmitted to the processor 110 as variable rate processor clock signal(s) 125. Although shown as a single signal, the variable rate processor clock signal(s) 125 may comprise a number of signals/phases having known timing relationships that are generated in response to the control signals 127. The control signals 127 may be conveyed from the processor 110 to the programmable clock source 120 in either a serial or parallel form.

In a representative embodiment of the present invention, as real-time clock such as the real-time clock 130 operates independently from the programmable clock source 120, to provide accurate measurement of intervals of time during which the operational behavior of the processor 110 is tested or monitored. Although shown external to the processor 110, the real-time clock 130 may, in some representative embodiments, be located within the processor 110 itself. The real-time clock 130 may, for example, comprise a register having a value readable by the processor 110, or a signal detectable by the processor 110, in which the occurrence of the signal represents the passage of a pre-defined unit of time that is accessed and/or recorded by the processor 110.

In a representative embodiment of the present invention, a non-volatile memory such as the NV memory 140 may be located within the processor 110, or may be a separate non-volatile memory device interfaced via a communication interface 145 to the processor 110 using any suitable microprocessor bus arrangement or a serial device interface standard such as, for example, the $I^2C$ or SPI bus interfaces, to name only two. The non-volatile memory 140 may comprise memory devices employing any of a number of memory technologies including, for example, NAND or NOR flash memory, electrically-erasable and programmable read-only memory (EEPROM), static or dynamic memory with battery or capacitive backup, to name only a few.

In a representative embodiment of the present invention, a temperature sensor such as the temperature sensor 150 may comprise a thermal diode such as, for example, those found in many computer and graphics processing devices such as, for example, the Pentium family of processors by Intel Corporation and the PowerPC family by IBM Corporation. The temperature sensor 150 may also comprise other temperature sensing technologies including, for example, resistive temperature sensing devices (RTDs), thermocouples, a diode-connected transistor, and integrated circuit temperature sensors such as, for example, a commercially available temperature sensing device like a National semiconductor LM63 temperature sensor, that is in the same thermal environment as the processor 110. It is preferable that the temperature sensor 150 track the temperature of the processor 110 as accurately as possible.

In addition to those elements described above, the processor 110 of FIG. 1 may be in communication with additional memory, peripherals, and other devices, illustrated as other peripherals/memory/etc 160, that are interfaced to the processor 110 via communication interface 165. These devices may include, for example, read-only and read-write memory, hard disk devices, removable memory devices, video interface devices, audio interface devices, and network interfaces for a variety of wired and wireless communication networks. The details of such additional system elements are not particularly pertinent to a discussion of the present invention, and will not be discussed further herein.

In a representative embodiment of the present invention, a processor such as, for example, the processor 110 of FIG. 1 may self-calibrate a processor clock rate of a processor clock signal such as processor clock signals 125 to a maximum appropriate or "good" processor clock rate at which the processor 110 operates reliably in the current operating environment (i.e., operating temperature, supply voltage, etc.) This self-calibration may be performed by the processor 110 during a separate time interval following power-up and before normal operation for its intended use begins, and/or it may be performed during normal operation for its intended use. The processor 110 may perform what is referred to herein as a "self-calibration activity", by first establishing a nominal processor clock rate within the range of processor clock rates specified for the processor 110 by the manufacturer, and then performing a series of tests at progressively higher processor clock rates until the processor 110 exhibits one or more processor clock rate-related errors in operation. In a representative embodiment of the present invention, a processor clock rate-related error may comprise a processor circuit malfunction that occurs during a recognized period of processor operation outside of manufacturer-specified processor clock rate limits. Examples of possible processor circuit malfunctions include unexpected trap conditions (e.g., bus errors, address alignment errors, divide by zero, etc.), asserts, data failures, and hardware or software watchdog timeouts. Detection of such errors and return to sane processor circuit operation may be managed using appropriate fault recovery techniques for each type of error, which may include fault analysis and logging, and most likely a graceful recovery (e.g., task re-creation), or in more severe situations (e.g., watchdog timeout), a processor restart or reboot. By measuring the length of error-free operation or elapsed time between such errors, at each of a number of tested processor clock rates, a representative embodiment of the present invention may determine a suitable maximum appropriate or "good" processor clock rate that may, in fact, exceed the highest processor clock rate specified by the manufacturer of the processor 110.

During a self-calibration activity, a processor in accordance with the present invention may calculate a maximum reliable or "good" processor clock rate using device characteristic information for the processor 110 and operating environment (e.g., temperature) information. Such device characteristic information may comprise temperature-related operating characteristics for the processor 110 that were observed during testing of the design and fabrication processes used in manufacturing for the processor 110. This device characteristic information may be stored in a non-volatile memory such as, for example, the NV memory 140 of FIG. 1.

In addition, the operating environment (e.g., temperature) information for the processor 110 during a period of self-calibration may be determined using a temperature sensor such as, for example, the temperature sensor 150 shown in FIG. 1. Such temperature information may be compared with information gathered during fabrication process and device characterization activities by the manufacturer.

Figure 2:
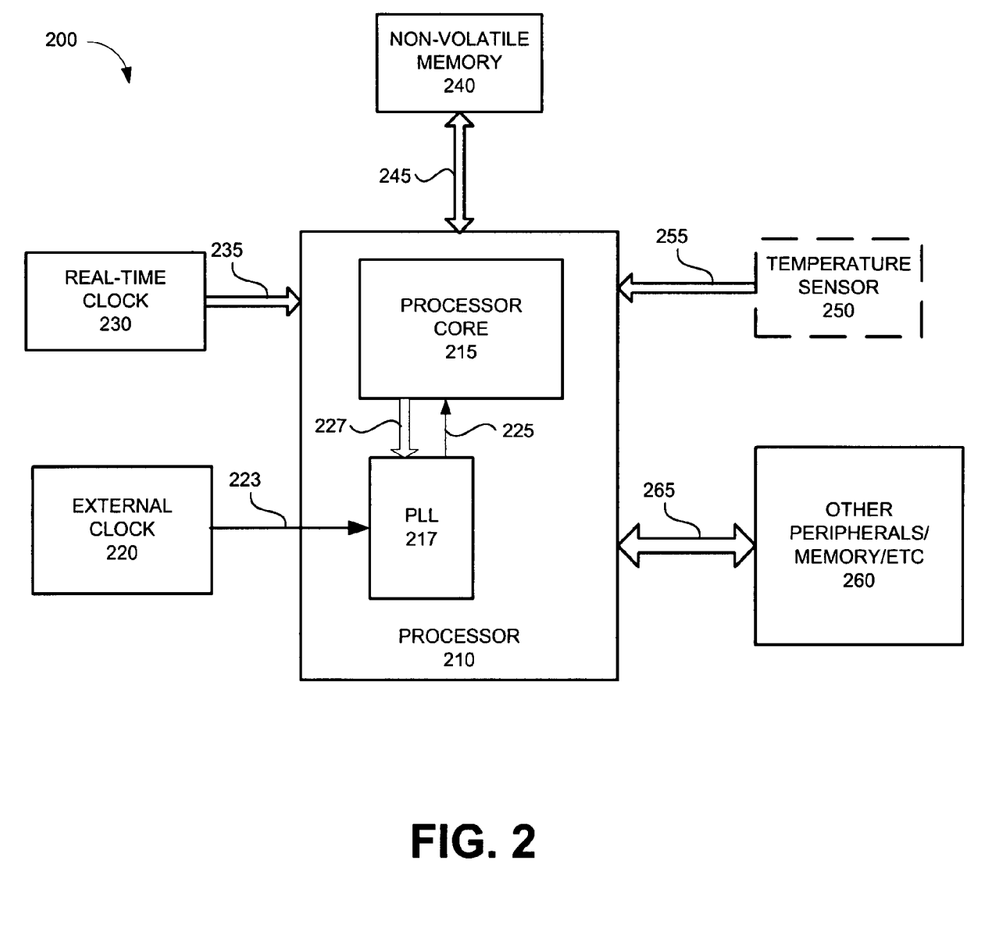
FIG. 2 illustrates another exemplary computer processor circuit that supports processor clock rate optimization, in accordance with a representative embodiment of the present invention.

FIG. 2 illustrates another exemplary computer processor circuit 200 that supports processor clock rate optimization, in accordance with a representative embodiment of the present invention. The circuit 200 of FIG. 2 is similar in many respects to that shown in FIG. 1, with the exception that FIG. 2 shows a fixed frequency external clock source 220 in place of the programmable clock source 120 of FIG. 1, and shows the presence of a phase locked loop (PLL) 217 representing circuitry suitable for synthesizing a variable rate clock signal 225 from the fixed external clock source 223, under control of the processor core 215 via control signals 227. In a representative embodiment of the present invention, the control signals 227 may be conveyed from the processor core 215 to the PLL 217 in either a serial or parallel form. Although shown as one signal, the variable rate clock signal 225 may comprise a number of signals/phases having known timing relationships that are generated in response to the control signals 227 and external clock signal 223. The PLL 217 is intended to represent one example of an approach to producing a programmable clock source from a fixed external clock source, and is not the only suitable approach. Other techniques may also be used and are contemplated.

Figure 3:
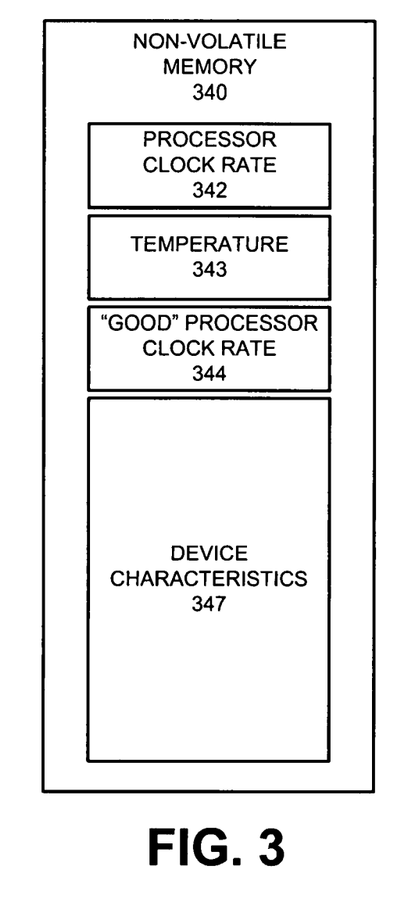
FIG. 3 illustrates an exemplary non-volatile memory that may correspond to, for example, the non-volatile memories of FIGS. 1 and 2, used to store variables and device information, in accordance with a representative embodiment of the present invention.

FIG. 3 illustrates an exemplary NV memory 340 that may correspond to, for example, the NV memories 140, 240 of FIGS. 1 and 2, used to store variables and device information, in accordance with a representative embodiment of the present invention. As shown in the example of FIG. 3, the NV memory 340 may comprise temperature information 343, processor clock rate information 342, and device characteristics information 347. The temperature information 343 and processor clock rate information 342 may be stored during a processor clock rate self-calibration activity, or during normal operation. A processor clock rate self-calibration activity may comprise a period of time when a processor such as, for example, the processors 110, 210 of FIGS. 1 and 2 perform algorithms to determine a maximum reliable or "good" processor clock rate. A self-calibration activity may also be performed during normal operation of a processor device for its intended use. This may occur when the processor clock rate of a processor circuit such as, for example, the processor circuit 100, 200 of FIGS. 1 and 2 is adjusted upon detection of a long error-free period of operation or when a processor clock rate-related error is detected. Exemplary processor clock rate self-calibration activities in accordance with representative embodiments of the present invention are described below in greater detail, with respect to FIGS. 4A, 4B and 5.

In a representative embodiment of the present invention, device characteristics information such as the device characteristics information 347 may, for example, comprise a table or histogram of processor clock rates and corresponding processor operating temperatures observed during prescreening or known from testing of the design and the fabrication processes. Table 1, below, shows a graphical representation of one possible form of such a table.

TABLE 1

| PROCESSOR CLOCK RATE | ELAPSED TIME UNTIL ERROR (sec.) | OPERATING TEMPERATURE |
|---|---|---|
| $f_1$ | 0.001 | T1 |
| $f_2$ | 0.080 | T2 |
| $f_2$ | 0.103 | T3 |
| $f_x$ | 0.248 | T4 |

Based on the example data above, the decision can then be taken as to which frequency to run at given manufacturer and customer expectations of field performance.

Note that after the initial self-calibration phase, it is possible to have similar error recovery software running in the application. Should unexpected failures occur that exceed a particular threshold or set of thresholds, then the application error handler may update the failure histogram and down-speed of its own accord. In this case, the application would update the actual elapsed time, and not just the predicted time in NV memory data.

It should also be noted that a representative embodiment of the present invention may employ integrity checks on non-volatile memory used to stored device characteristics and self-calibration information such as, for example, the NV memory 140, 240, 340 of FIGS. 1, 2 and 3. This may be done to detect corruption due to operational problems (e.g., system crash, power failure) that may occur while updating the non-volatile memory. For example, a cyclic redundancy check (CRC) or checksum may be computed for the non-volatile memory following each update of stored information. The CRC or checksum may later be re-computed and compared to the stored value prior to each access and use, to insure that stored information is valid. If the CRC is found to be incorrect, the information stored in the non-volatile memory may be considered to be bad and untrustworthy. In such a case, a self-calibration activity may be performed, beginning at the nominal processor clock rate. A representative embodiment of the present invention may employ individual CRC or checksum values that may be computed and written for separate portions of non-volatile memory (e.g., a row of Table 1). In this manner, only the portion of the non-volatile memory for which a CRC or checksum is found invalid may be discarded when an error is found, avoiding the loss of the entire contents of the region of non-volatile memory used for self-calibration.

Figure 4A:
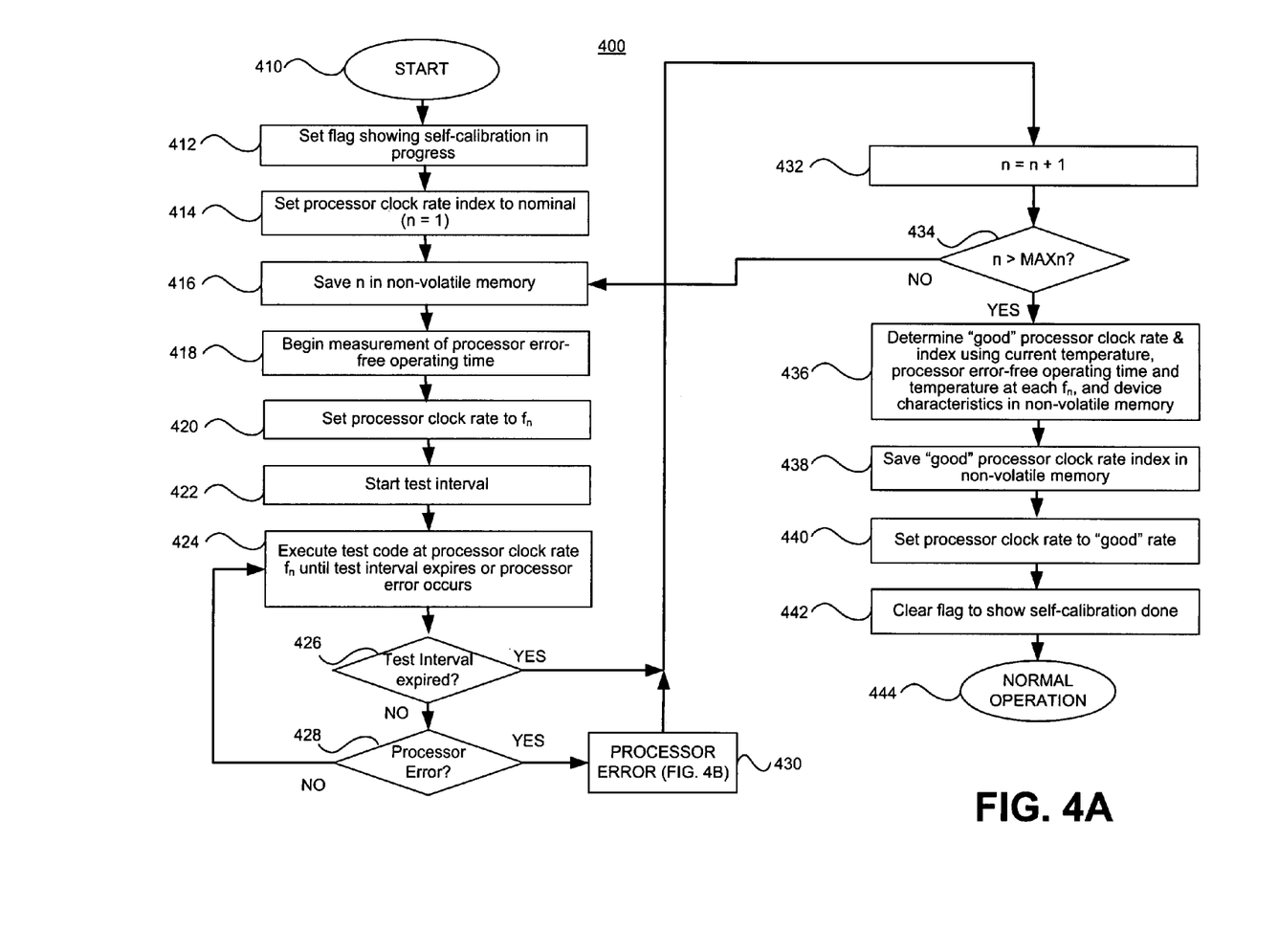
FIG. 4A shows a flowchart of an exemplary first portion of a method of self-calibrating a processor such as, for example, the processors of FIGS. 1 and 2 to an optimum processor clock rate following power-up of the processor and prior to normal operation of the processor for its intended use, in accordance with a representative embodiment of the present invention.

FIG. 4A shows a flowchart 400 of an exemplary first portion of a method of self-calibrating a processor such as, for example, the processors 110, 210 of FIGS. 1 and 2 to an optimum processor clock rate following power-up of the processor and prior to normal operation of the processor for its intended use, in accordance with a representative embodiment of the present invention. The following discussion makes reference to the elements of FIGS. 1, 2 and 3, in order to clarify operation of the method for the reader. In a first portion of the method, shown in FIG. 4A, a processor such as the processors 110, 120 of FIGS. 1 and 2 may be operated at a series of processor clock rates starting, for example, at the nominal processor clock rate specified by the manufacturer of the processor. The method of FIG. 4A may begin when the device in which the processor is installed starts up, following application of power (block 410). The method of FIG. 4A may also commence following each reset and/or reboot of the processors 110, 120. The processors 110, 210 may begin by setting a flag in non-volatile memory such as, for example, NV memories 140, 240, showing that a processor clock rate self-calibration activity is in progress (block 412). The method may then set the value of a processor clock rate index variable "n" to 1, to indicate that the nominal clock rate for the processor is currently being tested (block 414), and may store the value of n in non-volatile memory (block 416). The method of FIG. 4A then begins measurement of the elapsed time during which the processor operates error-free at a processor clock rate of $f_n$, using a real time clock such as, for example, the real-time clocks 130, 230. In a representative embodiment of the present invention, the real-time clocks 130, 230 run independently of the processor clock (block 418). Next, the method of FIG. 4A sets the processor clock rate of the programmable clock source (e.g., 120 of FIG. 1) or phase locked loop (e.g., PLL 217 of FIG. 2) to the clock rate indicated by the processor clock rate index variable, n (block 420). The processor (e.g., 110, 210) then commences a calibration interval (block 422) during which the processor executes test code at a processor clock rate of $f_n$ (block 424). Operation of the processor at a processor clock rate of $f_n$ continues until it is determined that the calibration interval has expired (block 426), or a processor error is detected (block 428). If it is determined that the calibration interval has expired (block 426), the processor increments the processor clock rate index variable n, to advance processor operation to the next higher processor clock rate (block 432). The processor clock rate index variable n is then examined to determine whether testing of a full range of clock rates to be tested has been completed (block 434). If the full range of processor clock rates has not yet been tested, the method of FIG. 4A loops back and saves the value of the processor clock rate index in non-volatile memory (block 416), and continues processor clock rate calibration as described above. If, however, the full range of processor clock rates has been tested (block 434), the method of FIG. 4A may determine a "good" or maximum reliable processor clock rate and representative index, using the temperature and processor error-free operating time information for each tested $f_n$, and processor device characteristics, stored in non-volatile memory (block 436). The method may then save the "good" processor clock rate index in non-volatile memory (block 438), and set the processor clock rate of the programmable clock source (e.g., 120 of FIG. 1) or phase locked loop (e.g., PLL 217 of FIG. 2) to the "good" processor clock rate (block 440). The flag indicating that calibration is active may then be cleared to indicate that calibration is complete (block 442), and the processor may commence normal operation for its intended use, at the "good" processor clock rate of $f_n$ (block 444).

Figure 4B:
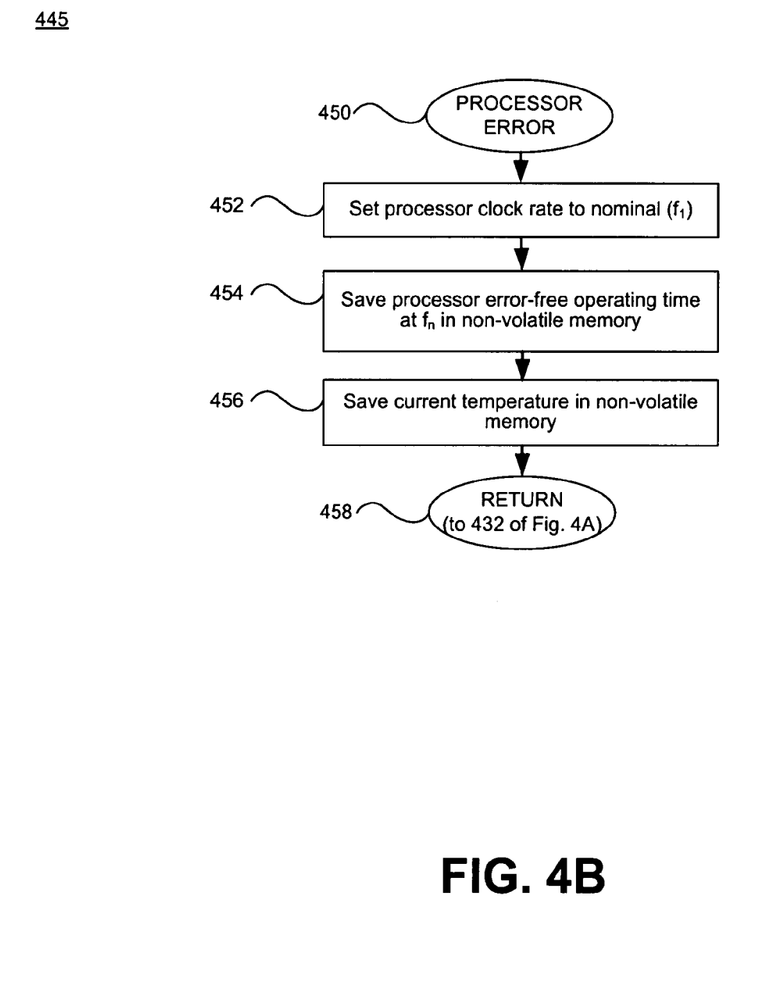
FIG. 4B shows a flowchart of an exemplary second portion of a method that is performed by a processor such as, for example, the processors of FIGS. 1 and 2 upon detection of a processor clock rate-related error, while the processor is performing the method of FIG. 4A, in accordance with a representative embodiment of the present invention.

If, however, it is determined that the calibration interval has not expired (block 426), a check is made to determine whether a processor error has occurred (block 428). It should be noted that, although this is shown in the illustration of FIG. 4A as a decision, this change in program flow may, in fact, result from a trap or interrupt, in various representative embodiments of the present invention. If a processor error has not occurred, the method of FIG. 4A loops back, and continues execution of the test code (block 424). If, however, a processor error has occurred (block 428), the method performs the actions shown in the portion of the method shown in FIG. 4B (block 450). The first action of the portion of the method shown in FIG. 4B is to set the processor clock rate of the processor undergoing processor clock rate calibration, to the nominal processor clock rate $f_l$, that is specified by the manufacturer for proper processor operation at all rated temperatures and supply voltages (block 452). The method of FIG. 4B may then save the measured processor error-free operating time while operating at processor clock rate $f_n$, in a non-volatile memory such as, for example, the NV memories 140, 240 of FIGS. 1 and 2 (block 454). The processor may also save the current temperature in non-volatile memory (block 456). Having stored the operating conditions when the processor error occurred, the method of FIG. 4B then returns to the method portion shown in FIG. 4A (block 432), and proceeds to test processor operation at the new, higher processor clock rate $f_n$, as previously described.

As illustrated in FIGS. 4A and 4B and described above, a representative embodiment of the present invention may begin processor clock rate calibration following power-up/reset/reboot of a processor performing self-calibration, but before normal operation of the processor for its intended use begins.

Figure 5:
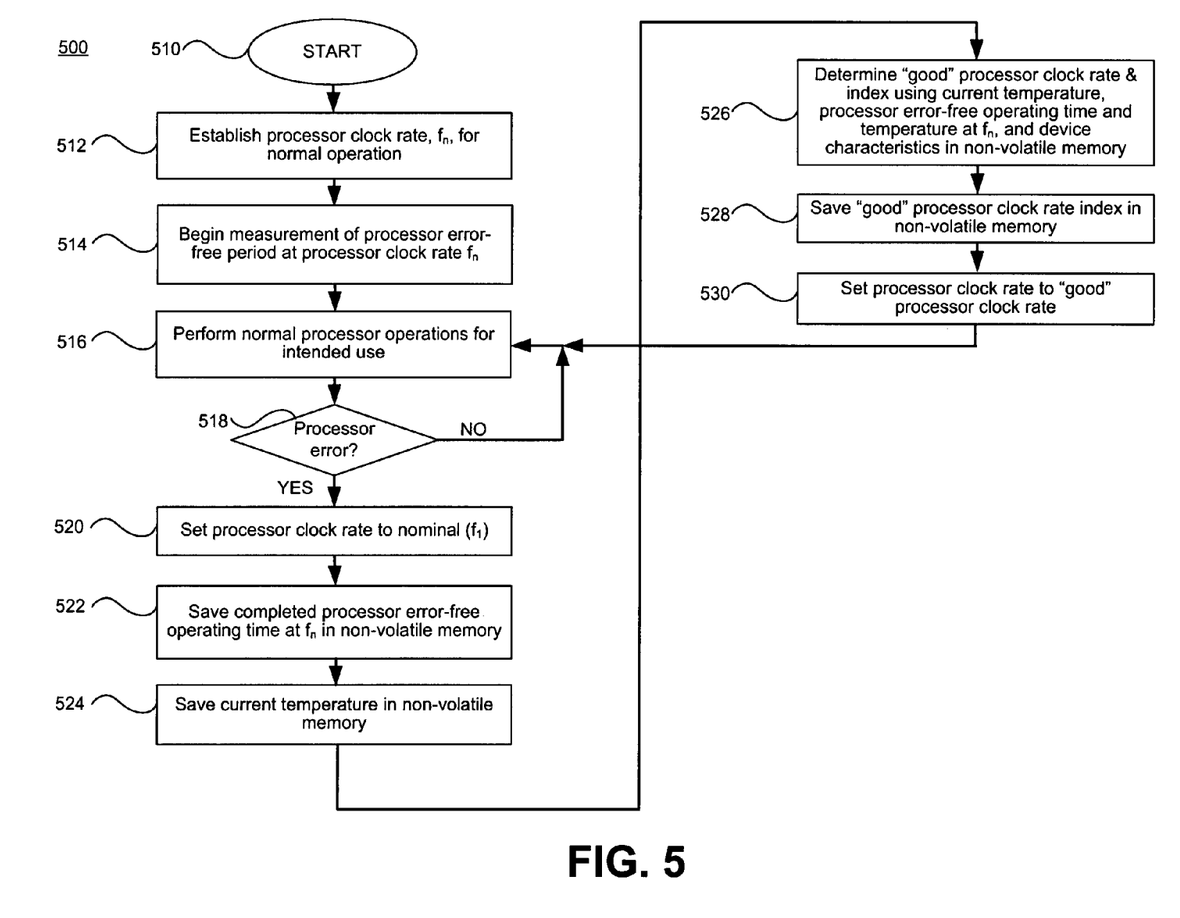
FIG. 5 shows a flowchart of an exemplary method of self-calibrating a processor clock rate of a processor such as, for example, the processors of FIGS. 1 and 2, during normal operation of the processor for its intended use, in accordance with a representative embodiment of the present invention.

FIG. 5 shows a flowchart 500 of an exemplary method of self-calibrating a processor clock rate of a processor such as, for example, the processors 110, 120 of FIGS. 1 and 2, during normal operation of the processor for its intended use, in accordance with a representative embodiment of the present invention. The method shown in FIG. 5 may be used in addition to the method shown in FIGS. 4A and 4B. The method of FIG. 5 begins following power-up and/or reset/reboot of a processor such as, for example, the processors 110, 210 shown in FIGS. 1 and 2. As a first action, the method of FIG. 5 may establish an initial processor clock rate $f_n$ for normal operation of the processor for its intended use (block 512). An index representing the initial processor clock rate may be retrieved from non-volatile memory such as, for example, the NV memory 140, 240 of FIGS. 1 and 2, having been determined during an earlier calibration process such as that described above with respect to FIGS. 4A and 4B. The method of FIG. 5 then begins measurement of a time interval of processor error-free operation at a processor clock rate of $f_n$ (block 514), and commences performance of normal processor operations for its intended use (block 516). If it is determined that a processor error has occurred (block 518), the method of FIG. 5 may set the processor clock rate to the nominal processor clock rate $f_l$ specified by the manufacturer for proper processor operation at all rated temperatures and supply voltages (block 520). In a representative embodiment of the present invention, a processor error may be defined as a processor circuit malfunction that occurs when operating at a processor clock rate in excess of the nominal processor clock rate $f_l$. Next, the method of FIG. 5 may save the measured processor error-free operating interval at $f_n$ in non-volatile memory (block 522). A representative embodiment of the present invention may also save the current operating temperature in non-volatile memory, as well (block 524). The method may then determine a "good" processor clock rate and index, using temperature and processor error-free operating interval information and processor device characteristics, stored in the non-volatile memory (block 526). The newly determined "good" processor clock rate index may then be saved in non-volatile memory (block 528), and the processor clock rate may be set to the "good" processor clock rate (block 530). The method of FIG. 5 may then return the processor to normal operation for its intended use (block 516).

Aspects of the present invention may be observed in an electronic device comprising a processor circuit operating at a processor clock rate determined by a programmable clock source under control of the processor circuit. The device may also comprise a non-volatile memory communicatively coupled to the processor circuit. In addition, the device may comprise a real time clock circuit for determining elapsed time, and the real time clock circuit may be communicatively coupled to the processor circuit. The processor circuit may automatically determine a maximum reliable processor clock rate by adjusting the processor clock rate in response to detection of processor circuit operational errors. A representative embodiment of the present invention may comprise a temperature sensing circuit communicatively coupled to the processor circuit. The maximum reliable clock rate may be stored in the non-volatile memory, and the non-volatile memory may comprise temperature related operating characteristics of the processor circuit. In some representative embodiments of the present invention, the automatic determination of processor clock rate may be performed subsequent to power-up of the central processor circuit, and prior to commencing operation of the central processing circuit in its primary function. In other representative embodiments of the present invention, the automatic determination of processor clock rate may be performed during operation of the computer processing circuit for its intended use. The programmable clock source may be disposed on the same integrated circuit as the processor circuit. The processor circuit may comprise a microprocessor core, and the processor circuit may comprise a digital signal processor core.

Additional aspects of the present invention may be seen in a self-calibrating method of optimizing a processor clock rate of an electronic device. Such a method may comprise detecting an operational error of the electronic device, and measuring a time interval of error free operation of the electronic device. The method may comprise determining a new processor clock rate based upon the measured time interval of error free operation and the current processor clock rate, and setting the current processor clock rate to the new processor clock rate. The determining may comprise selecting a new processor clock rate relatively lower than the current processor clock rate, if the determined time interval is less than a first threshold, and selecting a new processor clock rate relatively higher that the current processor clock rate, if the determined time interval is greater that a second threshold. The first and second thresholds may be different.

In a representative embodiment of the present invention, the method may also comprise establishing a current processor clock rate at an initial processor clock rate. The establishing may comprise retrieving a processor clock rate from non-volatile memory. The establishing may also comprise setting the current processor clock rate to a nominal processor clock rate, if the retrieved processor clock rate is not valid, and setting the current processor clock rate to the retrieved processor clock rate, if the retrieved processor clock rate is valid. The new processor clock rate may be determined using temperature related operating characteristics of the data processing device that are stored in non-volatile memory. Setting the current processor clock rate may comprise storing the current processor clock rate in non-volatile memory, and setting the current processor clock rate to the new processor clock rate. The electronic device may comprise a microprocessor core, and the electronic device may comprise a digital signal processor core.

Yet other aspects of the present invention may be found in a machine-readable storage having stored thereon a computer program having a plurality of code sections for performing a self-calibrating method of optimizing a processor clock rate of an electronic device. The code sections may be executable by a machine for causing the machine to perform the operations comprising detecting an operational error of the electronic device, and measuring a time interval of error free operation of the electronic device. The operations may also comprise determining a new processor clock rate based upon the measured time interval of error free operation and the current processor clock rate, and setting the current processor clock rate to the new processor clock rate. The determining may comprise selecting a new processor clock rate relatively lower than the current processor clock rate, if the determined time interval is less than a first threshold, and selecting a new processor clock rate relatively higher that the current processor clock rate, if the determined time interval is greater that a second threshold. In a representative embodiment of the present invention, the first and second thresholds may be different.

In various representative embodiments of the present invention, the code sections executable by a machine may further cause the machine to perform the operations comprising establishing a current processor clock rate at an initial processor clock rate. The establishing may comprise retrieving a processor clock rate from non-volatile memory. The establishing may also comprise setting the current processor clock rate to a nominal processor clock rate, if the retrieved processor clock rate is not valid, and setting the current processor clock rate to the retrieved processor clock rate, if the retrieved processor clock rate is valid. The new processor clock rate may be determined using temperature related operating characteristics of the data processing device that are stored in non-volatile memory. In a representative embodiment of the present invention, setting the current processor clock rate may comprise storing the current processor clock rate in non-volatile memory, and setting the current processor clock rate to the new processor clock rate. The electronic device may comprise a microprocessor core, and the electronic device may comprise a digital signal processor core.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A self-calibrating method of optimizing a processor clock rate of an electronic device, the method comprising:
    detecting an operational error of the electronic device;
    measuring a time interval of error free operation of the electronic device;
    determining a new processor clock rate based upon the measured time interval of error free operation and a current processor clock rate, wherein determining comprises selecting the new processor clock rate relatively lower than the current processor clock rate if the measured time interval is less than a first threshold, and selecting the new processor clock rate relatively higher than the current processor clock rate if the measured time interval is greater that a second threshold;
    setting the current processor clock rate to the new processor clock rate; and
    wherein the first and second thresholds are different.

2. The method according to claim 1, further comprising:
    establishing the current processor clock rate at an initial processor clock rate.

3. The method according to claim 2, wherein the establishing comprises:
    retrieving a processor clock rate from non-volatile memory.

4. The method according to claim 3, wherein the establishing comprises
    setting the current processor clock rate to a nominal processor clock rate, if the retrieved processor clock rate is not valid; and
    setting the current processor clock rate to the retrieved processor clock rate, if the retrieved processor clock rate is valid.

5. The method according to claim 1, wherein the new processor clock rate is determined using temperature related operating characteristics of the electronic device that are stored in non-volatile memory.

6. The method according to claim 1, wherein setting the current processor clock rate comprises:
    storing the current processor clock rate in non-volatile memory; and
    setting the current processor clock rate to the new processor clock rate.

7. The method of claim 1 wherein the electronic device comprises a microprocessor core.

8. The method of claim 1 wherein the electronic device comprises a digital signal processor core.

9. A self-calibrating method of optimizing a processor clock rate of an electronic device, the method comprising:
    establishing a current processor clock rate at an initial processor clock rate, wherein the establishing comprises retrieving a processor clock rate from non-volatile memory, setting the current processor clock rate to a nominal processor clock rate if the retrieved processor clock rate is not valid, and setting the current processor clock rate to the retrieved processor clock rate if the retrieved processor clock rate is valid;
    detecting an operational error of the electronic device;
    measuring a time interval of error free operation of the electronic device;
    determining a new processor clock rate based upon the measured time interval of error free operation and the current processor clock rate; and
    setting the current processor clock rate to the new processor clock rate.

10. The method according to claim 9, wherein determining comprises:
    selecting the new processor clock rate relatively lower than the current processor clock rate, if the measured time interval is less than a first threshold; and
    selecting the new processor clock rate relatively higher than the current processor clock rate, if the measured time interval is greater that a second threshold.

11. The method according to claim 9, wherein the first and second thresholds are different.

12. The method according to claim 9, wherein the new processor clock rate is determined using temperature related operating characteristics of the electronic device that are stored in non-volatile memory.

13. The method according to claim 9, wherein setting the current processor clock rate comprises:
    storing the current processor clock rate in non-volatile memory; and
    setting the current processor clock rate to the new processor clock rate.

14. The method of claim 9 wherein the electronic device comprises a microprocessor core.

15. The method of claim 9 wherein the electronic device comprises a digital signal processor core.

16. A machine-readable storage, having stored thereon a computer program having a plurality of code sections for performing a self-calibrating method of optimizing a processor clock rate of an electronic device, the code sections executable by a machine for causing the machine to perform the operations comprising:
    detecting an operational error of the electronic device;
    measuring a time interval of error free operation of the electronic device;
    determining a new processor clock rate based upon the measured time interval of error free operation and a current processor clock rate, wherein determining comprises selecting the new processor clock rate relatively lower than the current processor clock rate if the measured time interval is less than a first threshold, and selecting the new processor clock rate relatively higher than the current processor clock rate if the measured time interval is greater that a second threshold;
    setting the current processor clock rate to the new processor clock rate; and
    wherein the first and second thresholds are different.

17. The machine-readable storage according to claim 16, wherein the code sections executable by a machine further causing the machine to perform the operations comprising:
    establishing the current processor clock rate at an initial processor clock rate.

18. The machine-readable storage according to claim 17, wherein the establishing comprises:
retrieving a processor clock rate from non-volatile memory.

19. The machine-readable storage according to claim 18, wherein the establishing comprises
setting the current processor clock rate to a nominal processor clock rate, if the retrieved processor clock rate is not valid; and
setting the current processor clock rate to the retrieved processor clock rate, if the retrieved processor clock rate is valid.

20. The machine-readable storage according to claim 16, wherein the new processor clock rate is determined using temperature related operating characteristics of the electronic device that are stored in non-volatile memory.

21. The machine-readable storage according to claim 16, wherein setting the current processor clock rate comprises:
storing the current processor clock rate in non-volatile memory; and
setting the current processor clock rate to the new processor clock rate.

22. The machine-readable storage of claim 16 wherein the electronic device comprises a microprocessor core.

23. The machine-readable storage of claim 16 wherein the electronic device comprises a digital signal processor core.

24. A machine-readable storage, having stored thereon a computer program having a plurality of code sections for performing a self-calibrating method of optimizing a processor clock rate of an electronic device, the code sections executable by a machine for causing the machine to perform the operations comprising:
establishing a current processor clock rate at an initial processor clock rate, wherein the establishing comprises retrieving a processor clock rate from non-volatile memory, setting the current processor clock rate to a nominal processor clock rate if the retrieved processor clock rate is not valid, and setting the current processor clock rate to the retrieved processor clock rate if the retrieved processor clock rate is valid;
detecting an operational error of the electronic device;
measuring a time interval of error free operation of the electronic device;
determining a new processor clock rate based upon the measured time interval of error free operation and the current processor clock rate; and
setting the current processor clock rate to the new processor clock rate.

25. The machine-readable storage according to claim 24, wherein determining comprises:
selecting the new processor clock rate relatively lower than the current processor clock rate, if the measured time interval is less than a first threshold; and
selecting the new processor clock rate relatively higher that the current processor clock rate, if the measured time interval is greater than a second threshold.

26. The machine-readable storage according to claim 25, wherein the first and second thresholds are different.

27. The machine-readable storage according to claim 24, wherein the new processor clock rate is determined using temperature related operating characteristics of the electronic device that are stored in non-volatile memory.

28. The machine-readable storage according to claim 24, wherein setting the current processor clock rate comprises:
storing the current processor clock rate in non-volatile memory; and
setting the current processor clock rate to the new processor clock rate.

29. The machine-readable storage of claim 24 wherein the electronic device comprises a microprocessor core.

30. The machine-readable storage of claim 24 wherein the electronic device comprises a digital signal processor core.

31. A system supporting a self-calibrating method of optimizing a processor clock rate of an electronic device, the system comprising:
one or more circuits operable to, at least:
detect an operational error of the electronic device;
measure a time interval of error free operation of the electronic device;
determine a new processor clock rate based upon the measured time interval of error free operation and a current processor clock rate, wherein determining comprises selecting the new processor clock rate relatively lower than the current processor clock rate if the measured time interval is less than a first threshold, and selecting the new processor clock rate relatively higher than the current processor clock rate if the measured time interval is greater that a second threshold, wherein the first and second thresholds are different; and
set the current processor clock rate to the new processor clock rate.

32. The system according to claim 31, wherein the one or more circuits are operable to, at least:
establish the current processor clock rate at an initial processor clock rate.

33. The system according to claim 32, wherein the establishing comprises:
retrieving a processor clock rate from non-volatile memory.

34. The system according to claim 33, wherein the establishing comprises
setting the current processor clock rate to a nominal processor clock rate, if the retrieved processor clock rate is not valid; and
setting the current processor clock rate to the retrieved processor clock rate, if the retrieved processor clock rate is valid.

35. The system according to claim 31, wherein the new processor clock rate is determined using temperature related operating characteristics of the electronic device that are stored in non-volatile memory.

36. The system according to claim 31, wherein setting the current processor clock rate comprises:
storing the current processor clock rate in non-volatile memory; and
setting the current processor clock rate to the new processor clock rate.

37. The system of claim 31 wherein the electronic device comprises a microprocessor core.

38. The system of claim 31 wherein the electronic device comprises a digital signal processor core.

39. A system supporting a self-calibrating method of optimizing a processor clock rate of an electronic device, the system comprising:
one or more circuits operable to, at least:
establish a current processor clock rate at an initial processor clock rate, wherein the establishing comprises retrieving a processor clock rate from non-volatile memory, setting the current processor clock rate to a nominal processor clock rate if the retrieved processor clock rate is not valid, and setting the current processor clock rate to the retrieved processor clock rate if the retrieved processor clock rate is valid;

detect an operational error of the electronic device;

measure a time interval of error free operation of the electronic device;

determine a new processor clock rate based upon the measured time interval of error free operation and the current processor clock rate; and set the current processor clock rate to the new processor clock rate.

40. The system according to claim 39, wherein determining comprises:

selecting the new processor clock rate relatively lower than the current processor clock rate, if the measured time interval is less than a first threshold; and selecting the new processor clock rate relatively higher than the current processor clock rate, if the measured time interval is greater that a second threshold.

41. The system according to claim 39, wherein the first and second thresholds are different.

42. The system according to claim 39, wherein the new processor clock rate is determined using temperature related operating characteristics of the electronic device that are stored in non-volatile memory.

43. The system according to claim 39, wherein setting the current processor clock rate comprises:

storing the current processor clock rate in non-volatile memory; and setting the current processor clock rate to the new processor clock rate.

44. The system of claim 39 wherein the electronic device comprises a microprocessor core.

45. The system of claim 39 wherein the electronic device comprises a digital signal processor core.

46. One or more circuits that support a self-calibrating method of optimizing a processor clock rate of an electronic device, the one or more circuits comprising:

at least one processor operable to, at least:

detect an operational error of the electronic device;

measure a time interval of error free operation of the electronic device;

determine a new processor clock rate based upon the measured time interval of error free operation and a current processor clock rate, wherein determining comprises selecting the new processor clock rate relatively lower than the current processor clock rate if the measured time interval is less than a first threshold, and selecting the new processor clock rate relatively higher than the current processor clock rate if the measured time interval is greater than a second threshold, wherein the first and second thresholds are different; and set the current processor clock rate to the new processor clock rate.

47. The one or more circuits according to claim 46, wherein the at least one processor is operable to, at least:

establish the current processor clock rate at an initial processor clock rate.

48. The one or more circuits according to claim 47, wherein the establishing comprises:

retrieving a processor clock rate from non-volatile memory.

49. The one or more circuits according to claim 48, wherein the establishing comprises setting the current processor clock rate to a nominal processor clock rate, if the retrieved processor clock rate is not valid; and setting the current processor clock rate to the retrieved processor clock rate, if the retrieved processor clock rate is valid.

50. The one or more circuits according to claim 46, wherein the new processor clock rate is determined using temperature related operating characteristics of the electronic device that are stored in non-volatile memory.

51. The one or more circuits according to claim 46, wherein setting the current processor clock rate comprises:

storing the current processor clock rate in non-volatile memory; and setting the current processor clock rate to the new processor clock rate.

52. The one or more circuits of claim 46 wherein the electronic device comprises a microprocessor core.

53. The one or more circuits of claim 46 wherein the electronic device comprises a digital signal processor core.

54. One or more circuits that support a self-calibrating method of optimizing a processor clock rate of an electronic device, the one or more circuits comprising:

at least one processor operable to, at least:

establish a current processor clock rate at an initial processor clock rate, wherein the establishing comprises retrieving a processor clock rate from non-volatile memory, setting the current processor clock rate to a nominal processor clock rate if the retrieved processor clock rate is not valid, and setting the current processor clock rate to the retrieved processor clock rate if the retrieved processor clock rate is valid;

detect an operational error of the electronic device;

measure a time interval of error free operation of the electronic device;

determine a new processor clock rate based upon the measured time interval of error free operation and the current processor clock rate; and set the current processor clock rate to the new processor clock rate.

55. The one or more circuits according to claim 54, wherein determining comprises:

selecting a new processor clock rate relatively lower than the current processor clock rate, if the determined time interval is less than a first threshold; and selecting a new processor clock rate relatively higher than the current processor clock rate, if the determined time interval is greater that a second threshold.

56. The one or more circuits according to claim 54, wherein the first and second thresholds are different.

57. The one or more circuits according to claim 54, wherein the new processor clock rate is determined using temperature related operating characteristics of the electronic device that are stored in non-volatile memory.

58. The one or more circuits according to claim 54, wherein setting the current processor clock rate comprises:

storing the current processor clock rate in non-volatile memory; and setting the current processor clock rate to the new processor clock rate.

59. The one or more circuits of claim 54 wherein the electronic device comprises a microprocessor core.

60. The one or more circuits of claim 54 wherein the electronic device comprises a digital signal processor core.

* * * * *

UNITED STATES PATENT AND TRADEMARK OFFICE
CERTIFICATE OF CORRECTION

PATENT NO. : 7,650,527 B2  Page 1 of 1
APPLICATION NO. : 11/348689
DATED : January 19, 2010
INVENTOR(S) : Rambo et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 802 days.

Signed and Sealed this

Twenty-third Day of November, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,650,527 B2 | Page 1 of 1 |
| APPLICATION NO. | : 11/348689 | |
| DATED | : January 19, 2010 | |
| INVENTOR(S) | : Rambo et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 802 days.

Signed and Sealed this

Fifteenth Day of March, 2011

David J. Kappos
*Director of the United States Patent and Trademark Office*